United States Patent [19]

Kynast et al.

[11] Patent Number: 5,574,332
[45] Date of Patent: Nov. 12, 1996

[54] LUMINESCENT SCREEN

[75] Inventors: Ulrich H. Kynast, Roetgen; Volker U. Weiler, Aachen, both of Germany

[73] Assignee: U.S. Philips Corporation, New York, N.Y.

[21] Appl. No.: 359,243

[22] Filed: Dec. 16, 1994

[30] Foreign Application Priority Data

Dec. 17, 1993 [EP] European Pat. Off. ............. 93203574

[51] Int. Cl.⁶ ..................................................... C09K 11/06
[52] U.S. Cl. .......................... 313/483; 313/486; 313/463; 313/503; 313/467; 252/301.4 R
[58] Field of Search ...................................... 313/483, 485, 313/486, 463, 503, 467; 252/301.4 R

[56] References Cited

U.S. PATENT DOCUMENTS 5,360,361   1/1994   Bechtel et al. ........................... 445/40

FOREIGN PATENT DOCUMENTS 0522627   1/1993   European Pat. Off. .

*Primary Examiner*—Nimeshkumar Patel
*Attorney, Agent, or Firm*—Norman N. Spain

[57] ABSTRACT

The invention relates to a luminescent screen and to a low pressure mercury discharge lamp comprising such a luminescent screen. According to the invention the luminescent screen comprises a zeolite containing trivalent Ce. The luminescent screen exhibits a large quantum efficiency for converting UV radiation of 254 nm into radiation having an emission maximum at approximately 346 nm.

8 Claims, No Drawings

# LUMINESCENT SCREEN

BACKGROUND OF THE INVENTION

The invention relates to a luminescent screen comprising a bearer provided with a luminescent material and to a low pressure mercury discharge lamp provided with such a luminescent screen.

In general a luminescent screen is used to convert excitation energy into radiation within a certain range of wavelengths. The excitation energy can for instance consist of an electron beam, X-rays or UV radiation of relatively short wavelengths. Among many other applications luminescent screens find application in lamps, particularly in low pressure mercury discharge lamps or fluorescent lamps. The excitation energy then consists of UV-radiation of approximately 254 nm generated by mercury present in the plasma of the fluorescent lamp. The composition of the luminescent screen is chosen in dependence on the desired spectral composition of the light radiated by the fluorescent lamp. In many applications it is desirable that the fluorescent lamp radiates only light in the visible part of the spectrum. However, in some applications for instance in lamps for influencing photochemical processes, such as polymerization, lacquer hardening, drying, curing, medical irradiation purposes or suntanning, it is desirable that at least part of the light radiated by the lamp is UV radiation, more in particular so called UV-A radiation having wavelengths between 315 nm and 400 nm. A problem associated with such fluorescent lamps is that known luminescent materials having an emission maximum in the range between 315 nm and 400 nm have a relatively low quantum efficiency.

SUMMARY OF THE INVENTION

The invention aims to provide a luminescent screen comprising a luminescent material having an emission maximum in the range between 315 nm and 400 nm and having a relatively high quantum efficiency.

A luminescent screen according to the invention is therefore characterized in that the luminescent material comprises a zeolite containing trivalent Ce.

It has been found that a luminescent screen according to the invention has a relatively high quantum efficiency. In addition to this relatively high quantum efficiency, a luminescent screen according to the invention is relatively cheap because a zeolite containing ions of Ce is a relatively cheap component.

It be mentioned that zeolites containing ions of Ce are known as such from GB 1.357.591. In GB 1.357.591, however, only the properties of such zeolites as catalysts are disclosed and no mention is made of any luminescent properties.

Good results have been obtained with luminescent screens containing zeolites of the Faujasite-type, both of the X-type as well as of the Y-type, more in particular in case the Si/Al atomic ratio of the zeolite is in the range 1.0–4 and the number of trivalent Ce ions per unit cell is in the range 2–32. For zeolites containing less than 2 Ce ions per unit cell the quantum efficiency was found to be relatively low. 32 is the theoretical maximum for the number of Ce ions per unit cell of zeolites of the Faujasite type. These latter zeolites can be prepared relatively easily by means of exchanging Na-ions by Ce ions in a watery solution and show a high quantum efficiency.

Because of the relatively high quantum efficiency of a luminescent screen according to the invention and the high absorption of the mercury 254 nm radiation, such a luminescent screen is very suitable for use in low pressure mercury discharge lamps or fluorescent lamps.

DETAILED DESCRIPTION OF THE INVENTION

The following is a typical example of the incorporation of Ce in X-type zeolites.

2 grams of NaX (approximate composition $Na_{86.9}(AlO2)_{86.9}(SiO2)_{105.1}.264\ H_2O$) was suspended in water and the pH was adjusted at a value of approximately 5 by adding HCl. 6.37 ml of a 1M $CeCl_3$ solution was added and the suspension (total volume approximately 25 ml) was heated at approximately 100° C. for 4 hours. After that the zeolite was isolated, and dried under vacuum. EDAX measurements confirmed that approximately 55 % of the Na was replaced by Ce, so that the approximate composition of the reaction product was $Na_{38.9}Ce_{16}(AlO2)_{86.9}(SiO2)_{105.1}.264\ H_2O$. This corresponds to approximately 16 trivalent Cerium ions per unit cell.

Table I shows the optical properties of the zeolite luminescent material obtained as just described and some known luminescent materials also having an emission maximum between 300 nm and 400 nm. UV radiation with a wavelength of 254 nm was used as excitation energy. More than 90% of this radiation was absorbed. In the table $\lambda_{max}$ is the wavelength for which the emission of the luminescent material shows a maximum and $\Theta$ is the quantum efficiency. From this table it can be seen that the quantum efficiency of the zeolite containing ions of Ce is substantially higher than that of other luminescent materials having their emission maximum in the same range of wave length.

TABLE I

| Luminescent Material | $\lambda_{max}$(nm) | $\Theta$(%) |
|---|---|---|
| $Na_{38.9}Ce_{16}(AlO2)_{86.9}(SiO2)_{105.1}.264\ H_2O$ | 346 | 99.9 |
| $SrB_4O_7$:Eu | 368 | 86 |
| $(Sr,Ba)_2MgSi_2O_7$:Pb | 365 | 70 |
| $BaSi_2O_5$:Pb | 350 | 76 |

A luminescent screen in a low pressure mercury discharge lamp or fluorescent lamp may for example be applied at the outer surface of the discharge vessel. Otherwise the luminescent screen may be applied at its inner surface. In that case it is necessary to expel water from the luminescent screen in order to prevent that water vapour is released in the atmosphere of the discharge vessel. Water may for example be expelled by a heat-treatment, for example heating during two hours at a temperature of approximately 600° C. in air or in carbonmonoxide.

In a favourable embodiment of the luminescent screen of the invention, the number of trivalent Ce ions per unit cell is in the range 16–30. It has been found that with a Ce content lower than 16 a relatively strong decrease in quantum efficiency occurs as a result of the heat treatment.

Optimal results are obtained when the Ce content is in the range of 20–25

Optimal results are obtained when the Ce content is in the range of 20–25 Ce ions per unit cell. In order to obtain a luminescent screen with a Ce-content higher than 25 the process in which Na is replaced by Ce needs to have a relatively long duration, while no further improvement in the quantum efficiency is achieved.

We claim:

1. Luminescent screen comprising a substrate provided with a luminescent material, characterized in that the luminescent material comprises a zeolite containing trivalent Ce.

2. Luminescent screen as claimed in claim 1, wherein the zeolite is of the Faujasite-type.

3. Luminescent screen as claimed in claim 2, wherein Si and Al atoms of the zeolite are in a Si/Al atomic ratio in the range 1.0–4 and the number of trivalent Ce ions per unit cell is in the range 2–32.

4. Low pressure mercury discharge lamp provided with a luminescent screen as claimed in claim 3.

5. The luminescent screen as claimed in claim 3 wherein the number of trivalent Ce ions per unit cell is in the range of 16–30.

6. The luminescent screen as claimed in claim 5 wherein the number of trivalent Ce ions per unit cell is in the range of 20–25.

7. Low pressure mercury discharge lamp provided with a luminescent screen as claimed in claim 2.

8. Low pressure mercury discharge lamp provided with a luminescent screen as claimed in claim 1.

* * * * *